(12) United States Patent
Hall

(10) Patent No.: US 8,474,607 B2
(45) Date of Patent: Jul. 2, 2013

(54) INTEGRATED MULTI-FUNCTIONAL LINKS FOR CHAIN LINK CONVEYOR AND METHOD

(75) Inventor: William Carleton Hall, Gastonia, NC (US)

(73) Assignee: Ramsey Products Corporation, Charlotte, NC (US)

( * ) Notice: Subject to any disclaimer, the term of this patent is extended or adjusted under 35 U.S.C. 154(b) by 355 days.

(21) Appl. No.: 13/036,057

(22) Filed: Feb. 28, 2011

(65) Prior Publication Data

US 2012/0125743 A1 May 24, 2012

Related U.S. Application Data

(60) Provisional application No. 61/415,534, filed on Nov. 19, 2010.

(51) Int. Cl.
*B65G 17/06* (2006.01)

(52) U.S. Cl.
USPC .......................................... 198/851; 198/850

(58) Field of Classification Search
USPC ...................... 198/850, 851, 852, 853, 834
See application file for complete search history.

(56) References Cited

U.S. PATENT DOCUMENTS

| | | | |
|---|---|---|---|
| 2,653,485 A * | 9/1953 | MacArthur | 474/215 |
| 2,722,843 A | 11/1955 | Edwards, Jr. | |
| 3,602,364 A | 8/1971 | Maglio et al. | |
| 3,672,488 A | 6/1972 | Collins | |
| 3,980,173 A | 9/1976 | Riggs | |
| 4,044,649 A | 8/1977 | Wilder | |
| 4,266,661 A | 5/1981 | Andersson | |
| 4,283,184 A | 8/1981 | Berg | |
| 4,394,901 A | 7/1983 | Roinestad | |
| 4,436,200 A | 3/1984 | Hodlewsky et al. | |
| 4,505,383 A | 3/1985 | Wheeldon et al. | |
| 4,519,496 A | 5/1985 | Ludvigsen | |
| 4,615,343 A * | 10/1986 | Komossa | 131/111 |
| 4,708,701 A | 11/1987 | Cole, Jr. | |
| 4,976,662 A | 12/1990 | Miranti, Jr. | |
| 4,993,543 A | 2/1991 | Lapeyre | |
| 5,020,659 A | 6/1991 | Hodlewsky | |
| 5,042,244 A | 8/1991 | Worsley | |
| 5,125,504 A | 6/1992 | Corlett et al. | |
| 5,267,910 A * | 12/1993 | Maruyama et al. | 474/212 |
| 5,303,818 A | 4/1994 | Gruettner et al. | |
| 5,402,880 A | 4/1995 | Murphy | |
| 5,419,743 A * | 5/1995 | Takeda et al. | 474/157 |
| 5,435,435 A | 7/1995 | Chiba et al. | |

(Continued)

OTHER PUBLICATIONS

International Search Report for PCT/US2011/060735 mailed Mar. 27, 2012.

*Primary Examiner* — Gene Crawford
*Assistant Examiner* — Keith R Campbell
(74) *Attorney, Agent, or Firm* — Shumaker, Loop & Kendrick, LLP

(57) ABSTRACT

A multi-link conveyor chain is provided that includes a first plurality of links and a second plurality of links positioned along the length of the conveyor chain and collectively defining the conveyor chain. The first plurality of links has a wear surface that has enhanced wear resistance in relation to a conventional wear surface of the second plurality of links. The first plurality of links may be spaced in a pattern or randomly in the chain, in various percentages in relation to the second plurality of links.

14 Claims, 21 Drawing Sheets

U.S. PATENT DOCUMENTS

| | | | |
|---|---|---|---|
| 5,435,789 A | 7/1995 | Avramidis | |
| 5,464,374 A * | 11/1995 | Mott | 474/224 |
| 5,573,106 A | 11/1996 | Stebnicki | |
| 5,586,644 A | 12/1996 | Coen et al. | |
| 5,683,319 A | 11/1997 | Mott et al. | |
| 5,690,571 A | 11/1997 | Mott | |
| 5,758,484 A | 6/1998 | Ledvina et al. | |
| 5,800,301 A | 9/1998 | Anderson | |
| 5,826,705 A | 10/1998 | Ramsey et al. | |
| 5,857,933 A | 1/1999 | Patton | |
| 5,884,369 A | 3/1999 | Schick et al. | |
| 5,941,059 A | 8/1999 | Kanehira et al. | |
| 5,945,187 A | 8/1999 | Buch-Rasmussen et al. | |
| 5,957,268 A | 9/1999 | Meulenkamp | |
| 5,967,926 A * | 10/1999 | Kozakura et al. | 474/213 |
| 5,989,141 A * | 11/1999 | Kozakura et al. | 474/230 |
| 6,045,473 A | 4/2000 | Matsumoto et al. | |
| 6,068,568 A * | 5/2000 | Kozakura et al. | 474/212 |
| 6,155,944 A | 12/2000 | Matsuda | |
| 6,161,685 A | 12/2000 | Stebnicki | |
| 6,196,380 B1 | 3/2001 | Teuber et al. | |
| 6,244,983 B1 | 6/2001 | Matsuda | |
| 6,247,582 B1 | 6/2001 | Stebnicki et al. | |
| 6,325,735 B1 | 12/2001 | Kanehira et al. | |
| 6,345,715 B2 | 2/2002 | Palmaer | |
| 6,347,699 B1 | 2/2002 | Ramsey | |
| 6,360,881 B2 | 3/2002 | Stebnicki et al. | |
| 6,371,284 B1 | 4/2002 | Pasch | |
| 6,382,405 B1 | 5/2002 | Palmaer | |
| 6,450,910 B1 | 9/2002 | Matsumoto et al. | |
| 6,564,933 B2 * | 5/2003 | Morimoto et al. | 198/850 |
| 6,662,545 B1 | 12/2003 | Yoshida | |
| 6,666,013 B2 * | 12/2003 | Nakagawa et al. | 59/5 |
| 6,733,410 B2 * | 5/2004 | Saito | 474/212 |
| 6,763,936 B2 | 7/2004 | Marsetti et al. | |
| 6,779,653 B2 | 8/2004 | Garbagnati | |
| 6,969,332 B2 * | 11/2005 | Sakamoto et al. | 474/212 |
| 6,981,584 B2 | 1/2006 | Grabmann | |
| 7,044,290 B2 | 5/2006 | Garbagnati et al. | |
| 7,056,248 B2 * | 6/2006 | Butterfield | 474/212 |
| 7,137,917 B2 * | 11/2006 | Meyer | 474/213 |
| 7,267,221 B2 | 9/2007 | Hall | |
| 7,270,231 B2 | 9/2007 | Heber | |
| 7,404,778 B2 * | 7/2008 | Butterfield | 474/212 |
| 7,600,632 B2 | 10/2009 | Hall | |
| 7,658,277 B2 | 2/2010 | Meulenkamp | |
| 7,721,877 B2 | 5/2010 | Maine, Jr. et al. | |
| 7,802,675 B2 | 9/2010 | Hall | |
| 8,146,340 B2 * | 4/2012 | Shimada et al. | 59/5 |
| 8,322,522 B2 * | 12/2012 | Hall et al. | 198/851 |
| 2005/0183963 A1 | 8/2005 | Mori et al. | |
| 2006/0266623 A1 | 11/2006 | Heber | |
| 2007/0175738 A1 | 8/2007 | Neely et al. | |
| 2008/0017482 A1 | 1/2008 | Fandella | |
| 2009/0192000 A1 * | 7/2009 | Junig et al. | 474/215 |
| 2009/0277758 A1 | 11/2009 | Marshall | |

* cited by examiner

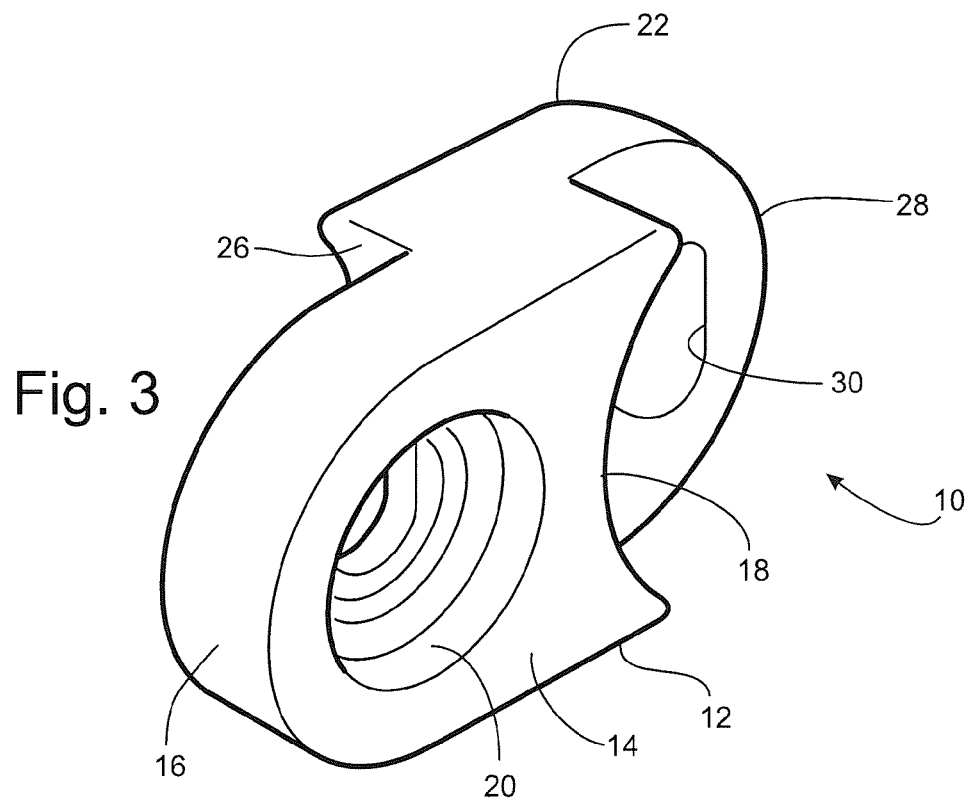
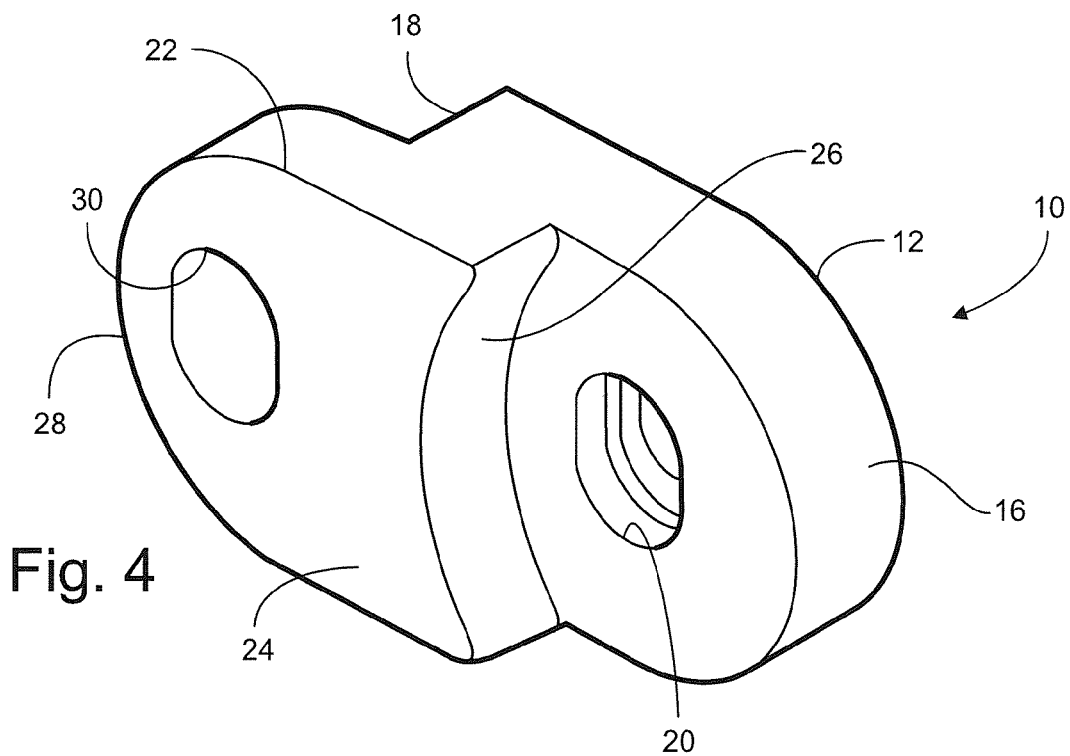

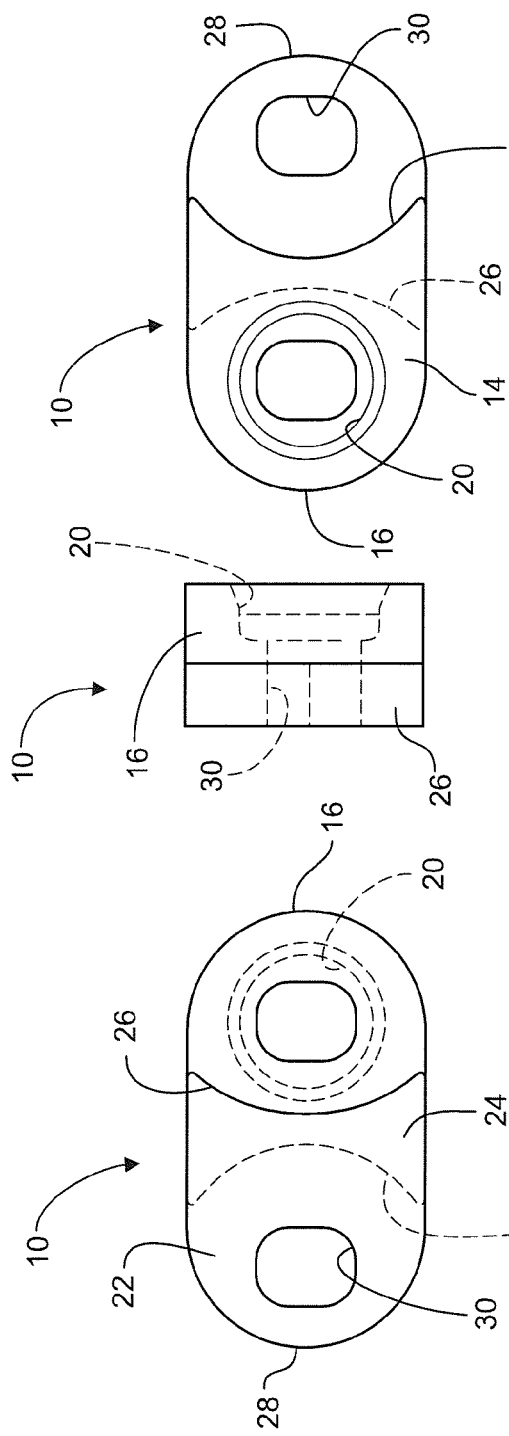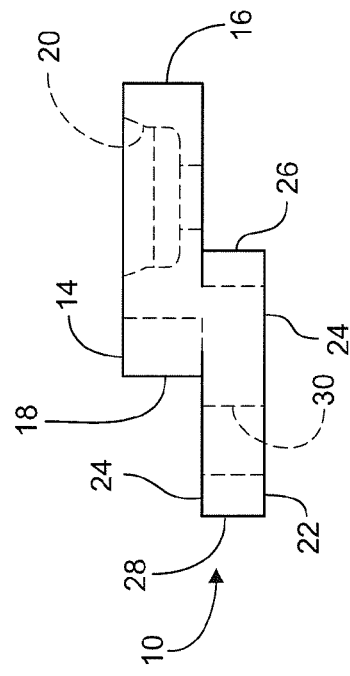

INTEGRATED MULTI-FUNCTIONAL LINKS FOR CHAIN LINK CONVEYOR AND METHOD

CROSS REFERENCE TO RELATED CASES

This application claims priority to U.S. Provisional Patent Application No. 61/415,534 filed on Nov. 19, 2010, the entirety of which is incorporated by reference herein.

TECHNICAL FIELD AND BACKGROUND OF THE INVENTION

This application relates to multi-link conveyor chains, such as silent or inverted tooth chains, and methods of improving various operating characteristics of conveyor chains. Such chains are frequently used in transporting and conveying materials either as a conveying surface or as the means for moving other containers in which a conveyed material is placed and are commonly used to transport items in a variety of industries. In conveying applications, conveyor chains generally slide on a wear resistant supporting surface with the teeth of the links facing downward, resting on the wear resistant surface. Items to be transported, for example, glass items such as bottles, are placed on the top of the chain. In conveying applications such as described above, the conveyor chain is subjected to wear at the tips of the link teeth where they contact the wear resistant supporting surface. As the chain rotates in its endless path, the tips of the link teeth are gradually worn down, decreasing the overall height of the conveying chain. As the chain height decreases, the accurate and uniform transfer of items onto and off of the top of the conveyor chain can be gradually impaired, resulting in product tipping and mishandling. Eventually, unless repaired or replaced, the conveyor chain height is reduced to the point that the chain is no longer usable.

In current practice, the individual link plates that make up the conveyor chain perform several important functions within the chain, including support of the chain provided by the link tips, control of the chain pitch according to the location and geometry of link apertures, contribution to chain tensile strength dependent on link geometry, and in some instances, guiding of the chain's interaction with sprockets.

In order to reduce the rate of link tip wear and prolong the useful life of the conveyor chain, some manufacturers produce conveyor chains in which every chain link is fabricated from materials having enhanced wear resistance, for example, wear resistant steel alloys. While the use of wear resistant materials for the entire chain may produce the desired reduction in link tip wear, such chains often contain thousands of individual link plates, making the overall chain cost prohibitive. The use of such enhanced wear resistant materials may also complicate the production of a chain with acceptable pitch and adequate tensile strength. Many such materials are difficult to machine or stamp, and the precise location and sizing of link holes needed to control chain pitch can be difficult. Additionally, some wear resistant materials are brittle and may have insufficient toughness or tensile strength, thereby reducing the overall load carrying capacity of the conveyor chain.

The prior art includes inverted tooth conveyor chains that have more than one link design incorporated into the chain. For instance, most conveying chains contain two link designs: conventional tooth shaped driving links and non-toothed guide links. The non-toothed guide links are designed to guide and retain the chain on sprockets during sprocket rotation. The guide links may be included in a chain assembly in single rows or in multiple rows, and these rows may be located on the outer edges of a chain or in the center of the chain. Although these guide links may rest on the wear plate that supports the chain and they may contribute to the support of the chain their intrinsic wear resistance does not differ from the conventional tooth shaped links in the chain. The guide links are manufactured in the same manner as conventional links and have many of the same features. They are stamped from the same steel type and thickness, they undergo the same heat treating, and the geometry and location of the link apertures within the link is the same as conventional links. Thus a chain containing conventional links and guide links is essentially homogeneous with regard to material type, material thickness, heat treatment, and aperture geometry and location.

Other prior art includes conveyor chains that are made with conventional inverted tooth links as well as special "end protector links" positioned only on the outside edges of the chain. These end protector links are designed to prevent the ends of the riveted pins, at the sides of the chain, from damage or wear caused by rubbing of the ends of the riveted pins against guide strips or other lateral obstructions. These end links are not designed to protect the chain from the link tip wear of the type that can cause vertical shifting of the conveyor chain from a nominal operating position over time. Also, since end protector links are located only at the edges of the conveyor chain, they do not restrict link tip wear across the full width of the chain. In chains with end protector links, conventional inverted tooth links in the chain assembly nevertheless rest directly on the conveying support surface, and experience link tip wear during chain operation.

Therefore, the present application discloses a variety of structures intended to prevent or substantially retard wear to a conveyor chain caused by prolonged engagement of chain link tips against a supporting surface.

SUMMARY OF THE INVENTION

Therefore, it is an object of the invention to provide chain link designs for increasing the wear resistance of conveying chains. Other embodiments are disclosed wherein the wear resistant links perform other functions such as enhancing pitch control and tensile strength.

These and other aspects of the invention are illustrated by way of example by providing a multi-link conveyor chain that includes a first plurality of links and a second plurality of links positioned along the length of the conveyor chain and collectively defining the conveyor chain, wherein first plurality of links has a wear surface that has enhanced wear resistance in relation to a wear surface of the second plurality of links.

According to one preferred embodiment of the invention, a multi-link conveyor chain includes a first plurality of interconnected links and a second plurality of links interspersed within the first plurality of interconnected links along a length of the conveyor chain. The second plurality of links has a wear surface that has enhanced wear resistance in relation to a wear surface of the first plurality of interconnected links, and is positioned to engage a support surface on which the conveyor chain moves for providing enhanced wear resistance to the conveyor chain.

According to another preferred embodiment of the invention, the second plurality of links is spaced laterally across a width of the conveyor chain.

According to yet another preferred embodiment of the invention, the second plurality of links is spaced longitudinally along a length of the conveyor chain.

According to yet another preferred embodiment of the invention, the second plurality of links is spaced at regular intervals laterally across a width of the conveyor chain.

According to yet another preferred embodiment of the invention, the second plurality of links is spaced at regular intervals longitudinally along a length of the conveyor chain.

According to yet another preferred embodiment of the invention, the second plurality of links is spaced irregularly along a length and width of the conveyor chain.

According to yet another preferred embodiment of the invention, the second plurality of links are spaced laterally across a width of the conveyor chain to coincide with spacing of guide grooves formed in a sprocket gear over which the conveyor chain passes.

According to yet another preferred embodiment of the invention, a multi-link conveyor chain the first plurality of links includes a first link segment having an outer wall in a first vertical plane defining a protective bearing surface having a forward-facing convex face and a rearward-facing concave face and a first, countersunk, pin access bore extending perpendicularly through the link between the forward-facing convex face and the rearward-facing concave face. A second link segment is integrally-formed with the first link segment and has an outer wall in a second vertical plane defining a protective bearing surface having a forward-facing concave face, a rearward-facing convex face having a second pin access bore extending perpendicularly through the link between the forward-facing convex face and the rearward-facing convex face. The forward-facing convex face of the first link segment and the forward-facing concave face of the second link segment have respective complementary arcuate shapes adapted to nest with and move relative to a respective rearward-facing concave face and rearward-facing convex face of a like end protector link forward of the end protector link to which the end protector link is nested in the conveyor chain. Laterally-extending pins extend through the pin access bores for pivotally connecting the links together to form the conveyor chain.

According to yet another preferred embodiment of the invention, the second plurality of links include a first link segment having an outer wall in a first vertical plane defining a protective bearing surface having a forward-facing convex face and a rearward-facing concave face and a first, countersunk, pin access bore extending perpendicularly through the link between the forward-facing convex face and the rearward-facing concave face. A second link segment is integrally-formed with the first link segment and has an outer wall in a second vertical plane defining a protective bearing surface having a forward-facing concave face, a rearward-facing convex face having a second pin access bore extending perpendicularly through the link between the forward-facing convex face and the rearward-facing convex face.

The forward-facing convex face of the first link segment and the forward-facing concave face of the second link segment have respective complementary arcuate shapes adapted to nest with and move relative to a respective rearward-facing concave face and rearward-facing convex face of a like end protector link forward of the end protector link to which the end protector link is nested in the conveyor chain. The wear surface is defined by laterally-extending surfaces of the second plurality of links.

According to yet another preferred embodiment of the invention, the first plurality of links and the second plurality of links have downwardly extending teeth for driving engagement with teeth of a conveyor sprocket gear.

According to yet another preferred embodiment of the invention, the first plurality of links have downwardly-extending teeth for driving engagement with teeth of a conveyor sprocket gear, and the second plurality of teeth have substantially planar top and bottom surfaces.

According to yet another preferred embodiment of the invention, the first plurality of links have downwardly-extending teeth for driving engagement with teeth of a conveyor sprocket gear, and the second plurality of links have downwardly-extending teeth for driving engagement with teeth of a conveyor sprocket gear.

According to yet another preferred embodiment of the invention, the second plurality of links is positioned to form at least one longitudinally extending band of laterally adjacent links.

According to yet another preferred embodiment of the invention, the wear surface of the second plurality of links has a hardness of between approximately Rockwell C 40 and Rockwell C 52 RC.

BRIEF DESCRIPTION OF THE DRAWINGS

Some of the aspects of the invention have been set forth above. Other aspects and advantages of the invention will appear as the description of the invention proceeds when taken in conjunction with the following drawings, in which:

FIGS. 3 and 4 are enlarged perspective views of a single end protector link according to one illustrative embodiment of the invention;

FIG. 5 is a first side view of the end protector link shown in FIGS. 3 and 4.

FIG. 6 is a front elevation view of the end protector link shown in FIGS. 3 and 4.

FIG. 7 is a second side view of the end protector link shown in FIGS. 3 and 4.

FIG. 8 is a top side view of the end protector link shown in FIGS. 3 and 4.

DESCRIPTION OF THE PREFERRED EMBODIMENTS AND BEST MODE

The disclosure of this application generally relates to a conveyor chains having wear resistant links positioned in the chain, and a method for assembling inverted tooth conveying chains whereby a cost effective, improvement in chain wear resistance is obtained, while maintaining chain pitch control and tensile strength. Preferably, during the assembly of an inverted tooth conveying chain, a mixture of two or more different link types, having different wear properties are incorporated into the chain to produce a final chain assembly that has improved wear characteristics.

As used in this application, the term "enhanced wear resistant links" and similar terms refer to links that are fabricated of materials that possess wear resistant properties that are substantially greater than other, typical, links in the conveyor chain, or which are treated in some manner to impart greater wear resistant properties to at least the wear surfaces of the link that are substantially greater than other links in the conveyor chain.

In one embodiment, a chain is assembled using a mixture of special wear resistant and more typical, inverted tooth links. In this embodiment, the typical inverted tooth chain links primarily provide two of the three functions outlined in paragraph 3 and image 3, the link holes control chain pitch and the link design influences tensile strength. The support of the chain is a function which is performed primarily by the wear resistant links. The typical inverted tooth links in the chain may bear some of the load associated with supporting the chain, but the wear resistant links perform the primary support function and thereby reduce the amount of wear that occurs at the link tips. The wear resistant links may also have enlarged holes so they have no affect on chain length of tensile strength. They are incorporated into the chain primarily to provide enhanced wear resistance but they may also perform other functions. By varying the number of wear resistant links in the assembly, the location of the links, and the shape of the links, further improvements in wear resistance, or other properties, can be obtained. Since wear resistant links make up only a portion of the assembled chain their influence on overall cost is limited. Wear resistant links may be produced from a variety of materials: powdered metal, forgings, ceramics, steel alloy, graphite, or other materials, as described in more detail below.

In other embodiments, a mixture of more than two different link types could be employed to obtain different overall chain characteristics. For example, a chain might be constructed of three different link types: one link designed to control chain pitch, another to enhance tensile properties, and another to improve wear resistance. The specific design, location, and numbers of the respective links could be varied to produce a unique combination of attributes in the final chain assembly.

Figure 1:
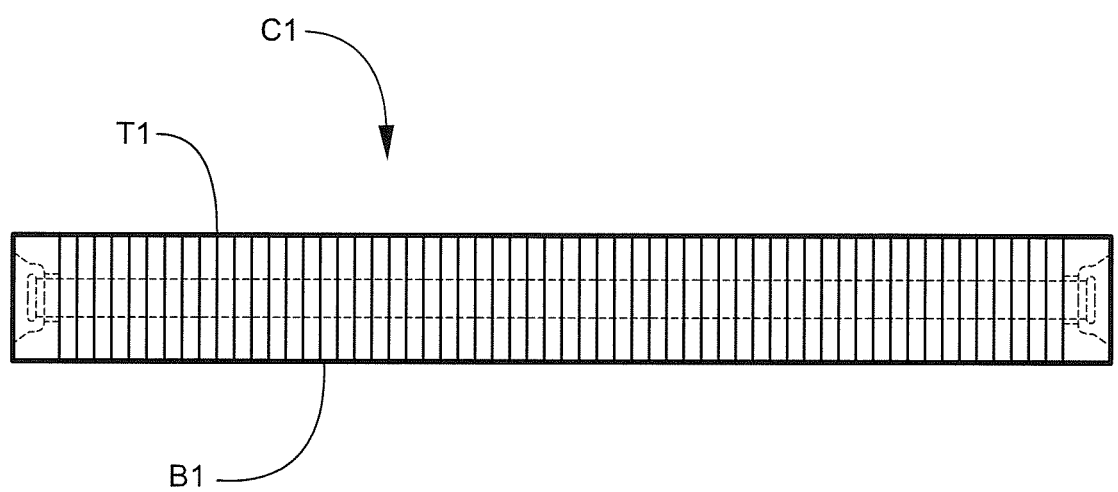
FIG. 1 is a side-to-side vertical cross-section of a unused prior art conveyor chain, showing even parallel top and bottom surfaces.
Figure 2:
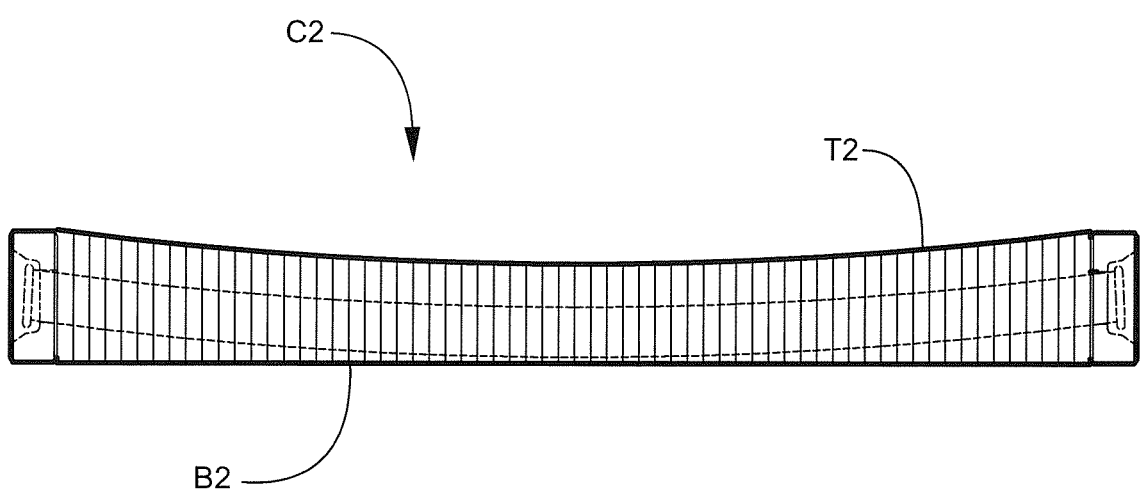
FIG. 2 is a side-to-side vertical cross-section of a worn prior art conveyor chain, showing an uneven, dished top product-conveying surface caused by wear to the bottom, wear surface.

Referring now specifically to FIGS. 1 and 2, a prior art link conveyor chain "C" is shown schematically to illustrate the wear that occurs in conventional conveyor chains as the chain proceeds through its use cycle. FIG. 1 illustrates that a new chain C1 has parallel top and bottom surfaces T1 and B1, but as the chain is used, the bottom surface wears away, and is shown at B2. This chain C1 has wear resistant links located on the outside edges and conventional links in between. Initially, the height of all links in the assembly is similar and the bottom and top of the chain surfaces T1 and B1 are flat. FIG. 2 depicts the same chain after the chain has been run and the tips of links in the central portion of the chain C1 have worn down. This is the type of wear that can be expected when a conveyor chain is subjected to a transverse loading near the center of the chain. As illustrated, the wearing of the link tips causes the pins in the chain to deflect downward in response to the transverse loading. As this happens, the centrally located links defining the top surface T2 drop below the bottom surface B2, creating a dished, uneven surface that can interfere with product transport. As described below, this condition is avoided by chains that incorporate bands or rows of centrally located wear resistant links.

FIGS. 3 and 4 illustrate a single end protector link 10 according to one illustrative embodiment of the invention. The link 10 includes a first link segment 12 having an outer wall 14 in a first vertical plane defining a protective bearing surface having a forward-facing convex face 16, and a rearward-facing concave face 18 and a first, countersunk, pin access bore 20 extending perpendicularly through the link 10 between the forward-facing convex face 16 and the rearward-facing concave face 18. Each pin access bore 20 can be circular or non-circular. A second link segment 22 is integrally-formed with the first link segment 12 and has an outer wall 24 in a second vertical plane defining a protective bearing surface having a forward-facing concave face 26. A rearward-facing convex face 28 is provided and has a second pin access bore 30 extending perpendicularly through the link 10 between the forward-facing convex face 26 and the rearward-facing convex face 28. Each pin access bore 30 can be circular or non-circular. The forward-facing convex face 16 of the first link segment and the forward-facing concave face 26 of the second link segment 22 have respective complementary arcuate shapes adapted to nest with and move relative to a respective rearward-facing concave face 18 and rearward-facing convex face 28 of a like end protector link 10 forward of the end protector link 10 to which the end protector link 10 is nested in the conveyor chain. The rearward-facing convex face 28 of the second link segment 22 and the rearward-facing concave face 18 of the first link segment 12 have respective complementary arcuate shapes adapted to nest with and move relative to a respective forward-facing concave face 26 and forward-facing convex face 16 of a like end protector link 10 rearward of the end protector link 10 to which the end protector link is nested in the conveyor chain. See, also, FIGS. 5-8, showing respective first side, front elevation, second side and top side views of the end protector link 10. End protector links 10 are preferably cast metal, but can be formed by other processes and of other materials, such as plastics, ceramics, and resin-based products.

Figure 9:
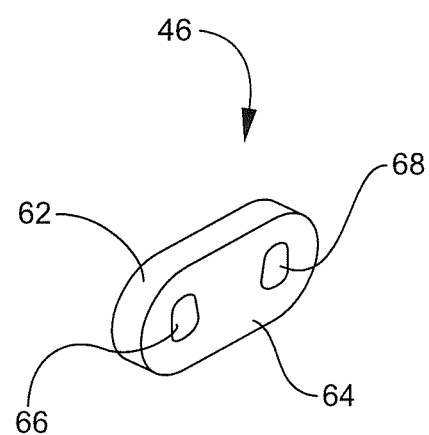
FIG. 9 is a perspective view of a wear resistant link according to one embodiment of the invention.

Referring now to FIG. 9, a wear resistant link 46 according to one embodiment is shown, and includes an edge surface 62 that encompasses the top, bottom and front and back edge surfaces of the link 46, and opposing major faces, major face 64 being shown. A pair of spaced-apart pin access bores 66, 68 interconnect the links 46 with the other links of the chain, as described below.

Figure 10:
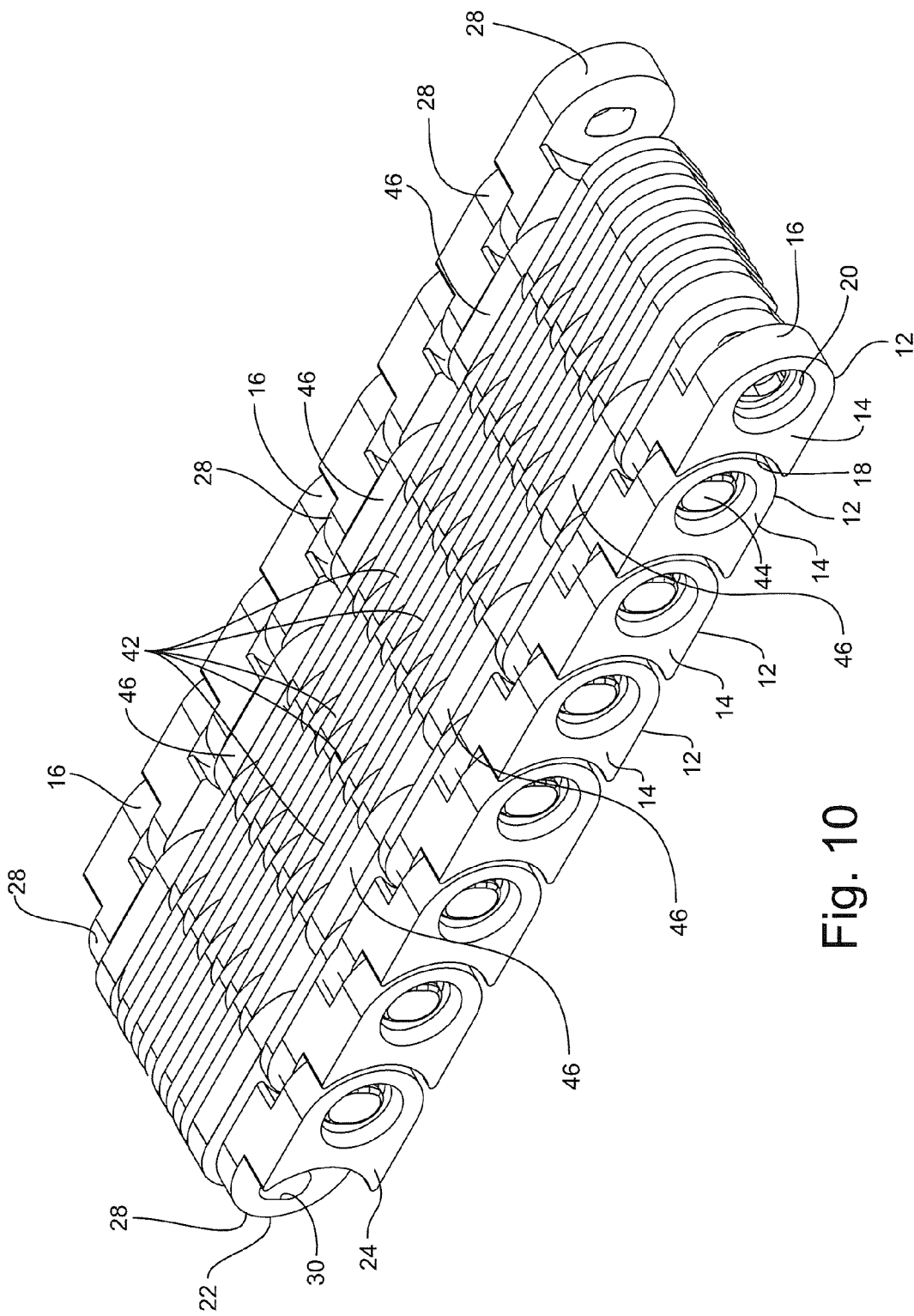
FIG. 10 is a top perspective view of a length of conveyor chain showing nested end protector links and wear resistant links according to an illustrative embodiment of the invention.
Figure 11:
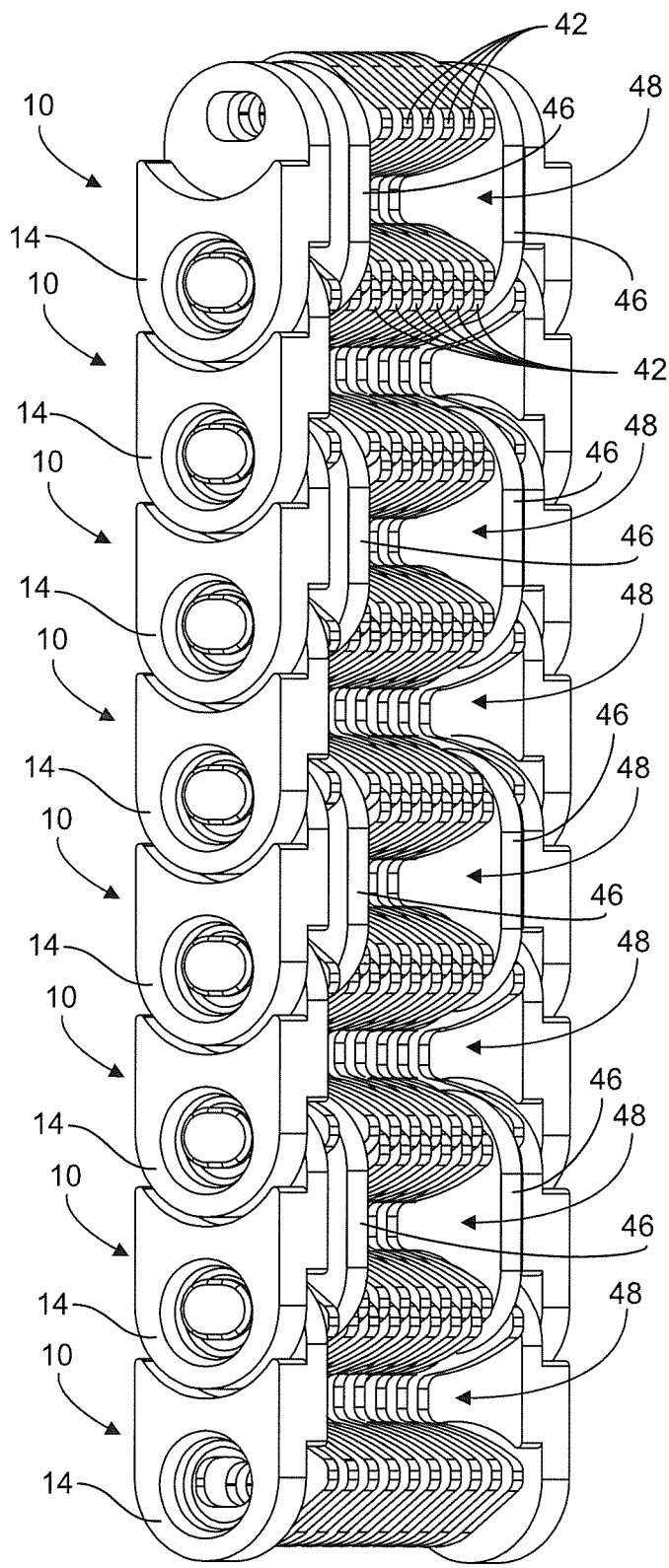
FIG. 11 is a bottom perspective view of a length of conveyor chain showing nested end protector links and wear resistant links according to an illustrative embodiment of the invention.

As shown in FIGS. 10-11, an assembled chain 40 includes conventional chain links 42, end protector links 10, and wear resistant links 46, all of which are assembled and held in place by pins 44. The links 46 can be interspersed among the conventional links 42 in numerous orientations and relative percentages. For example, FIGS. 10-11 show the links 46 placed in two (2) longitudinally-extending rows with conventional links 42 laterally positioned between the links 46. Other embodiments would allow links 46 to be placed in two or more adjacent longitudinally-extending rows, with no conventional links 42 positioned between the rows of links 46. Additional embodiments would allow links 46 to be distributed among conventional links 42 not in longitudinally-extending rows, but in other, non-linear, patterns or random locations.

Figure 12:
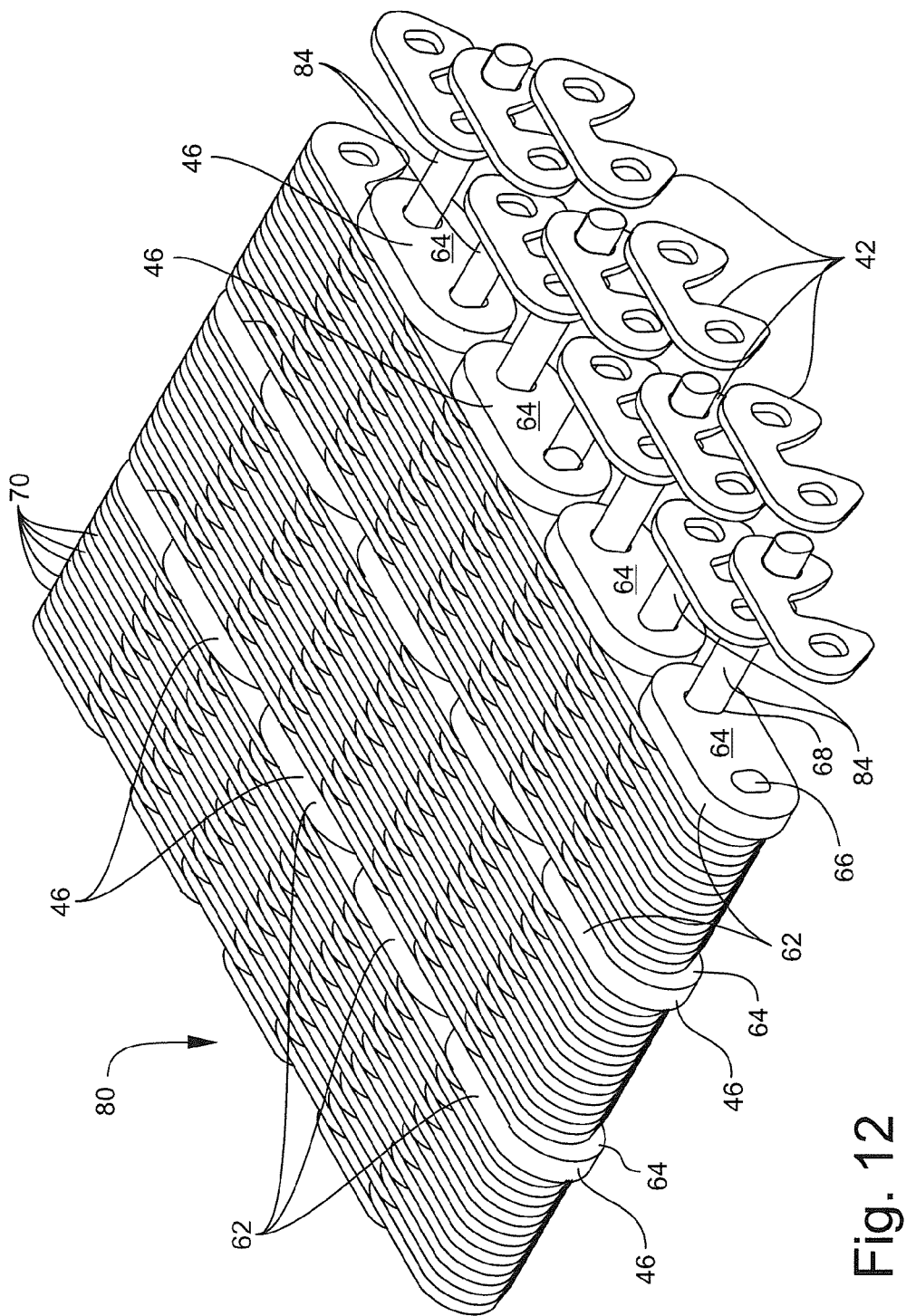
FIG. 12 is a perspective view of a length of conveyor chain with wear resistant links, showing assembly of the chain.
Figure 13:
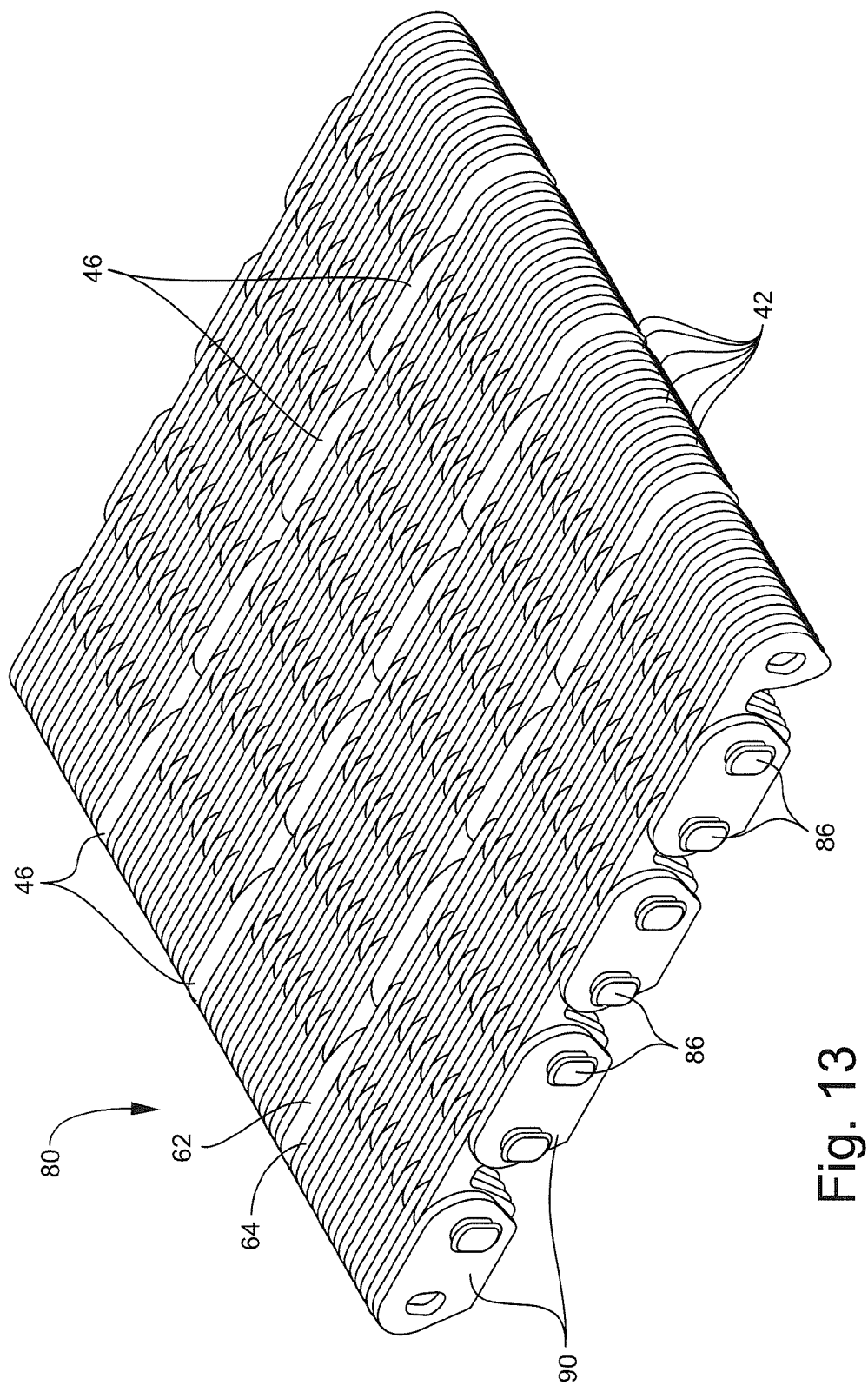
FIG. 13 is a top perspective view of a length of conveyor chain with wear resistant links.
Figure 14:
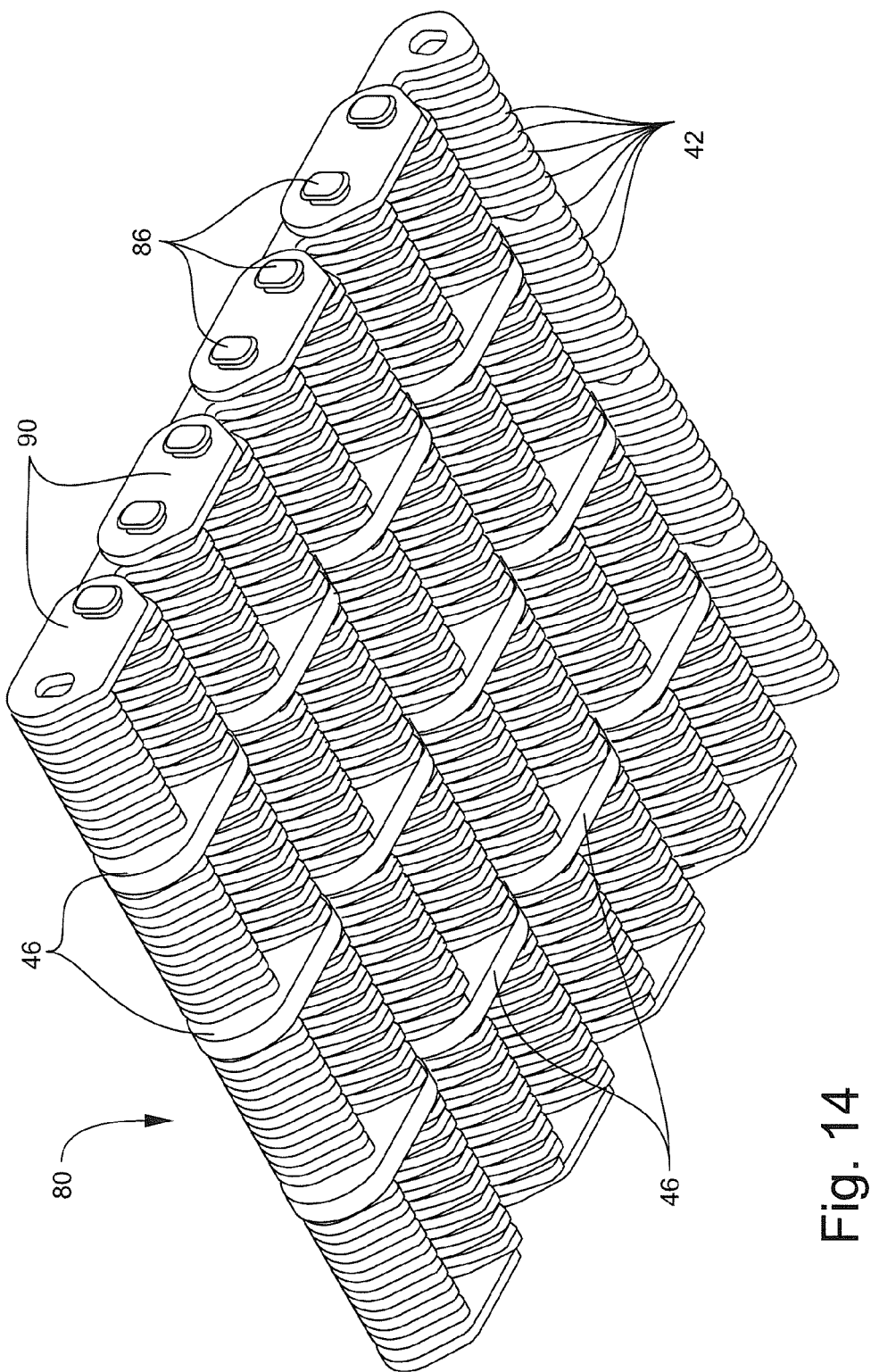
FIG. 14 is a bottom perspective view of the conveyor chain with wear resistant links shown in FIG. 14.

Referring now to FIGS. 12-14, a chain 80 is illustrated. The chain 80 is fabricated of three types of links—enhanced wear resistant links 46, conventional links 42, and guide links 90. Note that the guide links 90 are not nested (compare with end links 10 in FIGS. 10-11). The links 46, 42 and 90 are arrayed on laterally-extending pins 84 in the manner shown in FIG. 12, with the pins 84 having the ends enlarged to form heads 86, in the manner shown in FIGS. 13-14. One arrangement is shown in FIGS. 12-14, with the wear resistant links 46 extending longitudinally in spaced-apart rows with 15 conventional links 42 positioned between each row of wear resistant links 42. However, this is only one of many arrangements that would be suitable. Other suitable arrangements would be various arrangements similar to that shown in FIGS. 12-15 but with different spacing, both laterally and longitudinally, between the wear-resistant links 46 and the conventional links 42, as well as randomly-inserted wear resistant links 46, and bands of wear-resistant links 46 formed by adjacent wear resistant links 46 across the width of the chain 80 from one side to the other.

Figure 15:
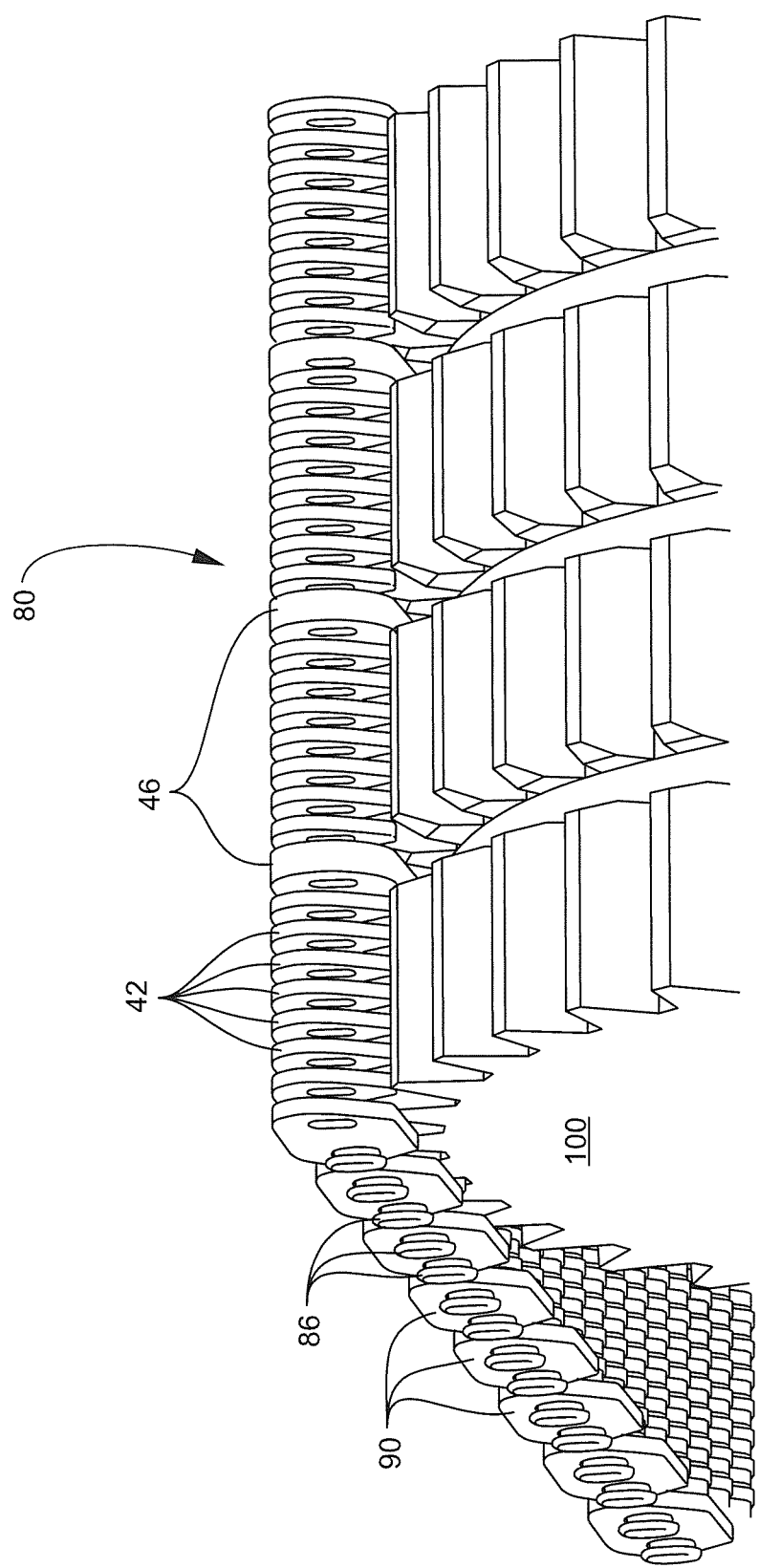
FIG. 15 is a fragmentary perspective view of a length of the conveyor chain shown in FIGS. 13 and 14, mounting on a conveyor sprocket.

Referring to FIG. 15, the chain 80 is driven and guided by toothed sprockets, such as a sprocket 100. As noted in FIG. 15, the sprocket has grooves into which the wear resistant links 46 are received and aligned. These grooves allow the chain 80, with wear resistant links 46, to wrap around the sprocket circumference without the links 46 engaging or interfering with the sprocket teeth. The links 46 and sprocket grooves may also serve to guide and maintain the alignment of the chain 80 on the sprocket 100. However, this guiding function can be performed by conventional guide links and it is not necessary that the wear resistant links 46 form the guiding elements of the chain.

Conventional chain links, such as links 42, are made from medium to low carbon steel which has been through hardened to achieve a hardness between approximately Rockwell C 40 and Rockwell C 52 RC. Wear resistant links 46 are preferably fabricated from grades of steel that include stainless steel, chromium alloy, high manganese steel, sintered metals, and ceramics, as well as other proprietary formulations that have the desired wear resistance. Alternatively, the wear resistant links 46 include materials with specific, special forms of heat treatment, like case-hardening, or with wear resistant coatings applied at least to the wear surfaces.

In addition, the wear resistant links may be thicker or thinner than other links, have circular or non-circular holes, and be generally oval in shape. Also, the wear resistant links are shown in FIGS. 12-15 as being located in three bands or lines running the length of the chain. In practice, they may be located in a fewer or greater number of bands. Also, the bands may be, but are not necessarily, symmetrically located with respect to the right and left edges of the chain. That is, bands may be closer to one edge than the other. Location of the bands can be varied during chain assembly to produce chains that have the desired support at a given location in the chain. For instance, if it is known that a chain will be subjected to a certain "transverse load" that was located approximately 1 inch from the chain's left edge, then the chain can be assembled with a band of wear resistant links 46 positioned approximately 1 inch from the chain's left edge. This has the desired effect of supporting the chain at the location where the loading is focused.

Another embodiment of this invention includes wear resistant links interspersed within the body of the chain randomly, rather than in linear bands. With random dispersement the overall wear properties of the chain will be improved, while avoiding the extra expense associated with building a chain entirely from 100% wear resistant links.

Figure 16A:
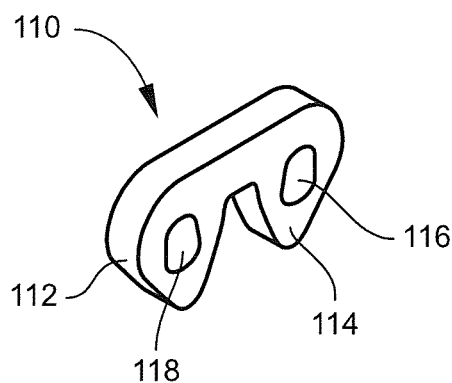
FIGS. 16a and 16b are respective perspective and side views of a toothed wear resistant link according to one embodiment of the invention.
Figure 16B:
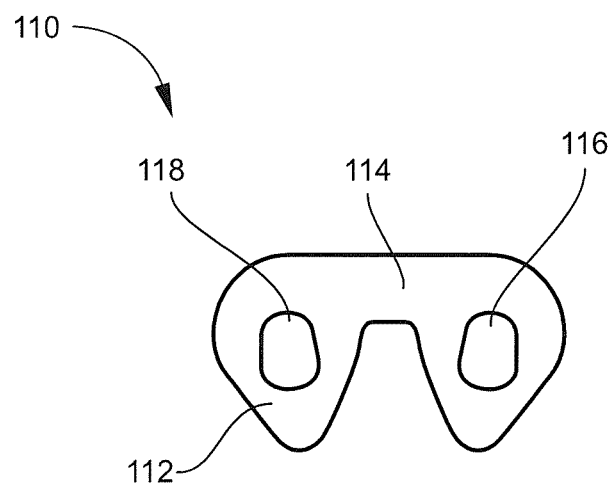
Figure 17:
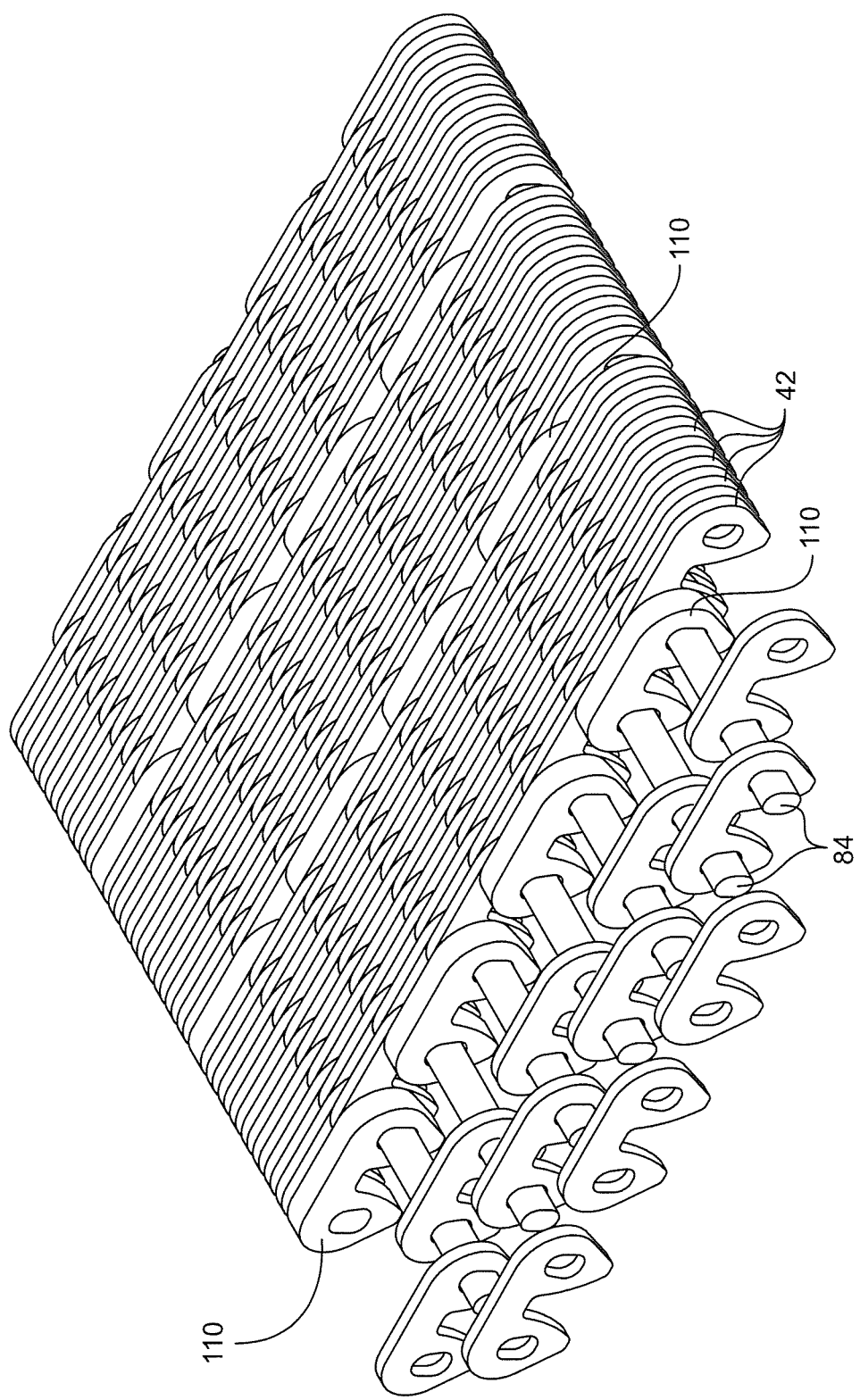
FIG. 17 is a top perspective view of a length of conveyor chain having toothed wear resistant links as shown by FIGS. 16a and 16b, showing assembly of the chain.
Figure 18:
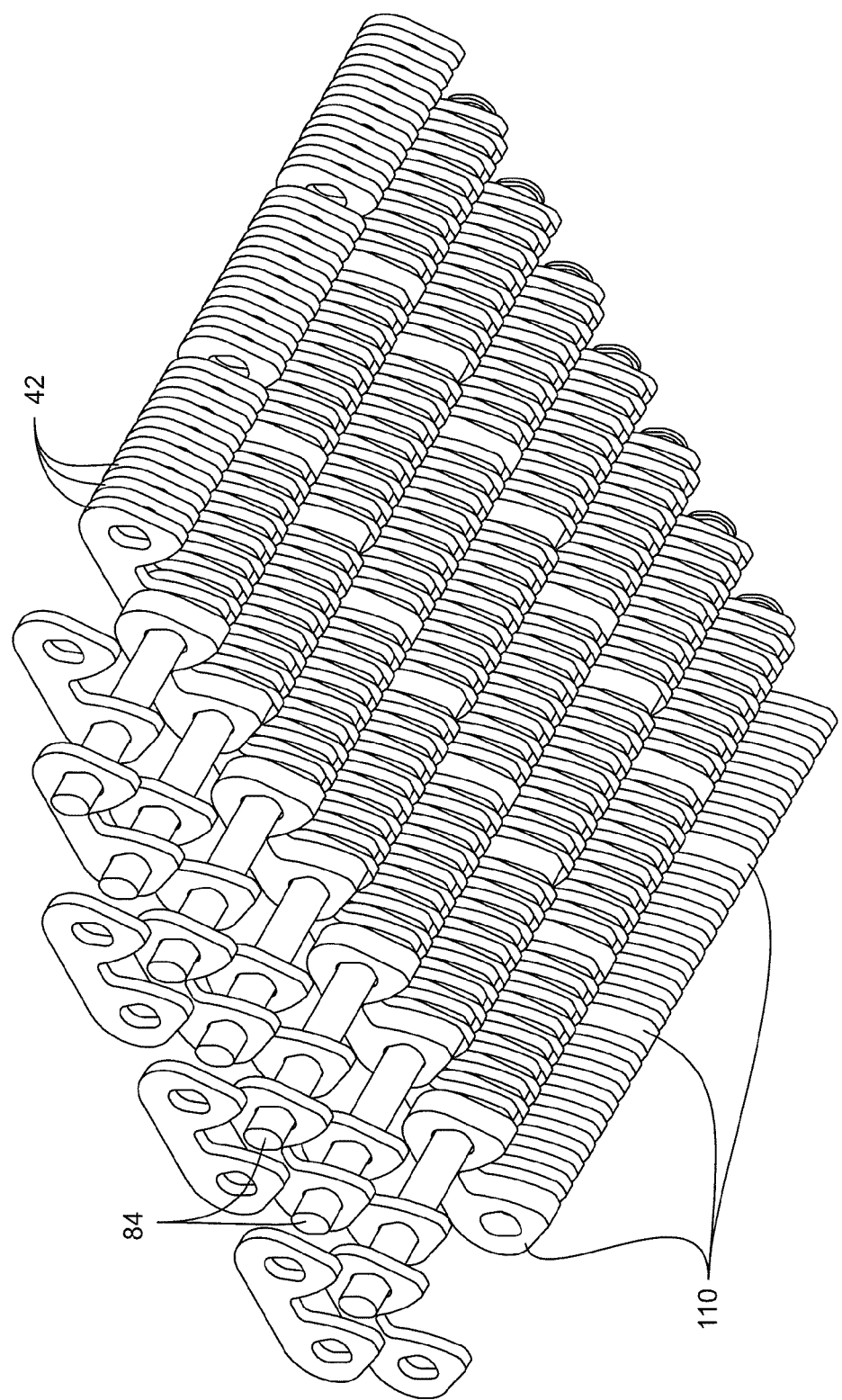
FIG. 18 is a bottom perspective view of a length of conveyor chain shown in FIG. 17, showing assembly of the chain.

In addition, the wear resistant links may have shapes different from that depicted in FIG. 9. They may be provided with downwardly-extending teeth, as shown at reference numeral 110 in FIGS. 16a and 16b, which illustrate respective perspective and side views of link 110. FIGS. 17 and 18 illustrate respective top and bottom perspective views of a length of conveyor chain having toothed wear resistant links as shown by FIGS. 16a and 16b, showing assembly of the chain.

Figure 19A:
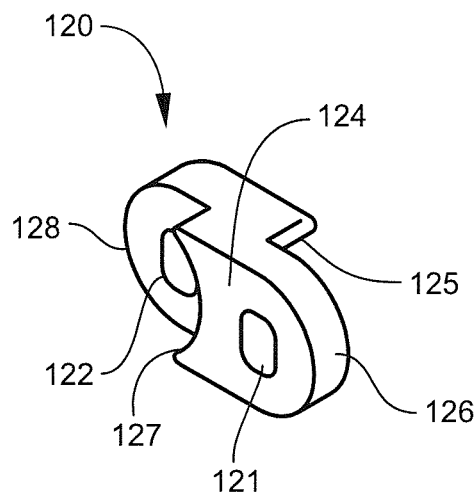
FIGS. 19a-19c are respective perspective, side and top views of a wear resistant link with a nesting contour according to one embodiment of the invention.
Figure 19B:
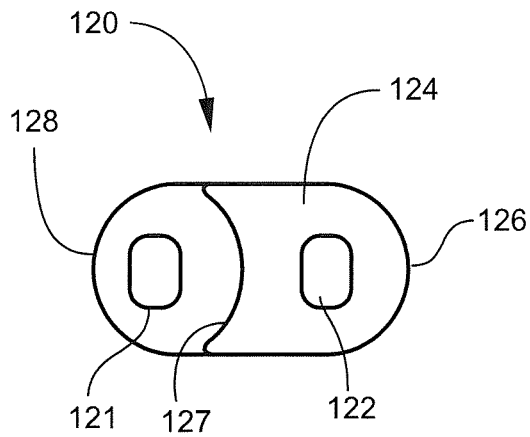
Figure 19C:
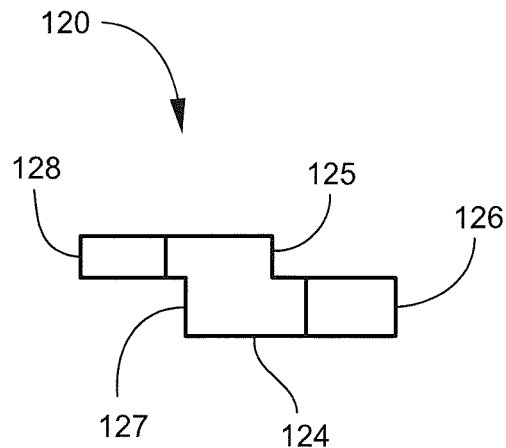

The wear resistant links may also have a shape which allows consecutive links to "nest" against one another, as shown at reference numeral 120 in FIGS. 19a-19c, illustrating respective perspective, side and top views of a wear resistant link with a nesting contour. These wear resistant links 120 are similar in shape to the end protector links depicted in FIGS. 3-8, but unlike end protector links, they do not necessarily contain the counter bores that allow pin heads to be recessed.

Figure 20:
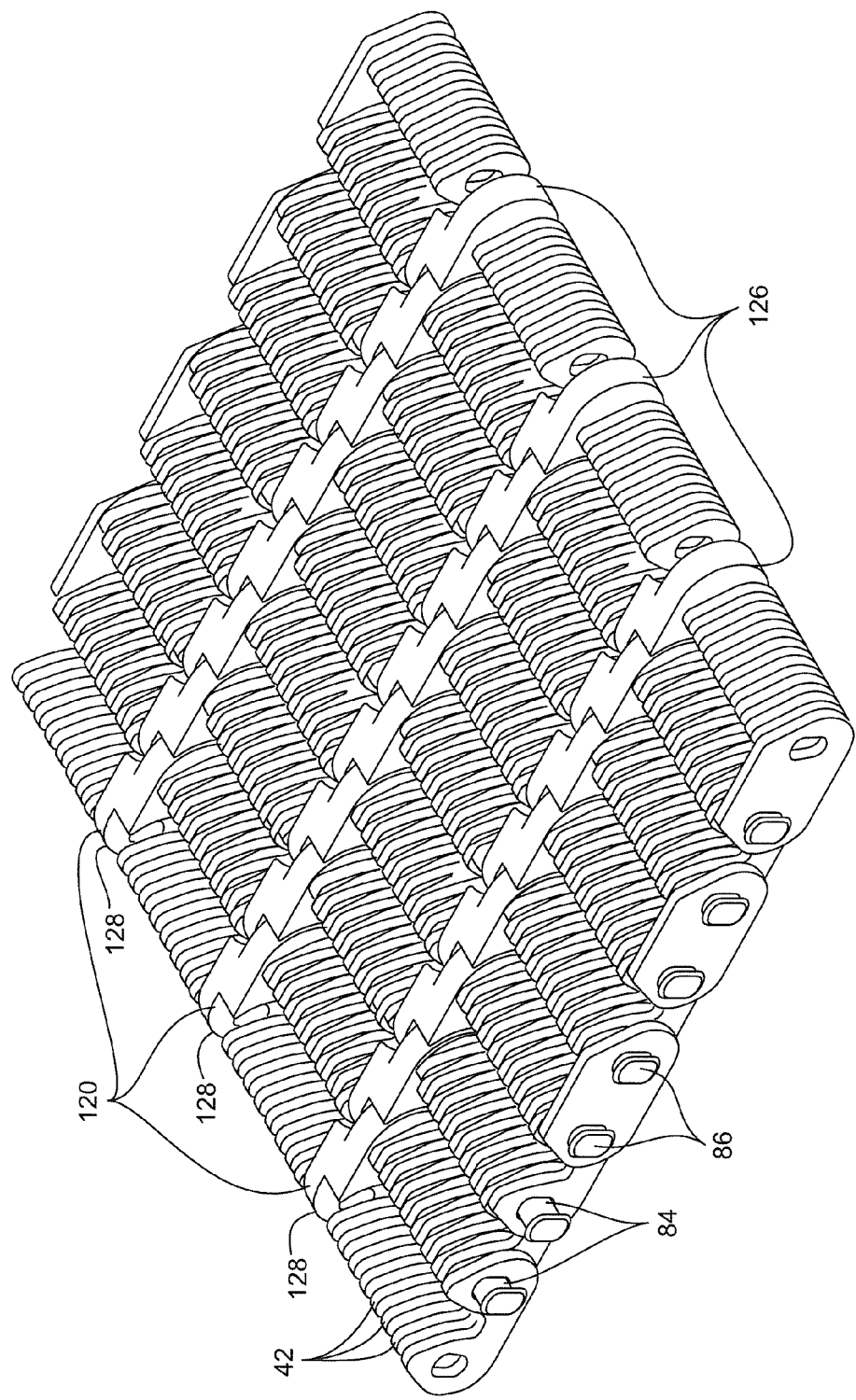
FIG. 20 is a bottom perspective view of a length of conveyor chain showing 3 rows of nested wear resistant links.
Figure 21:
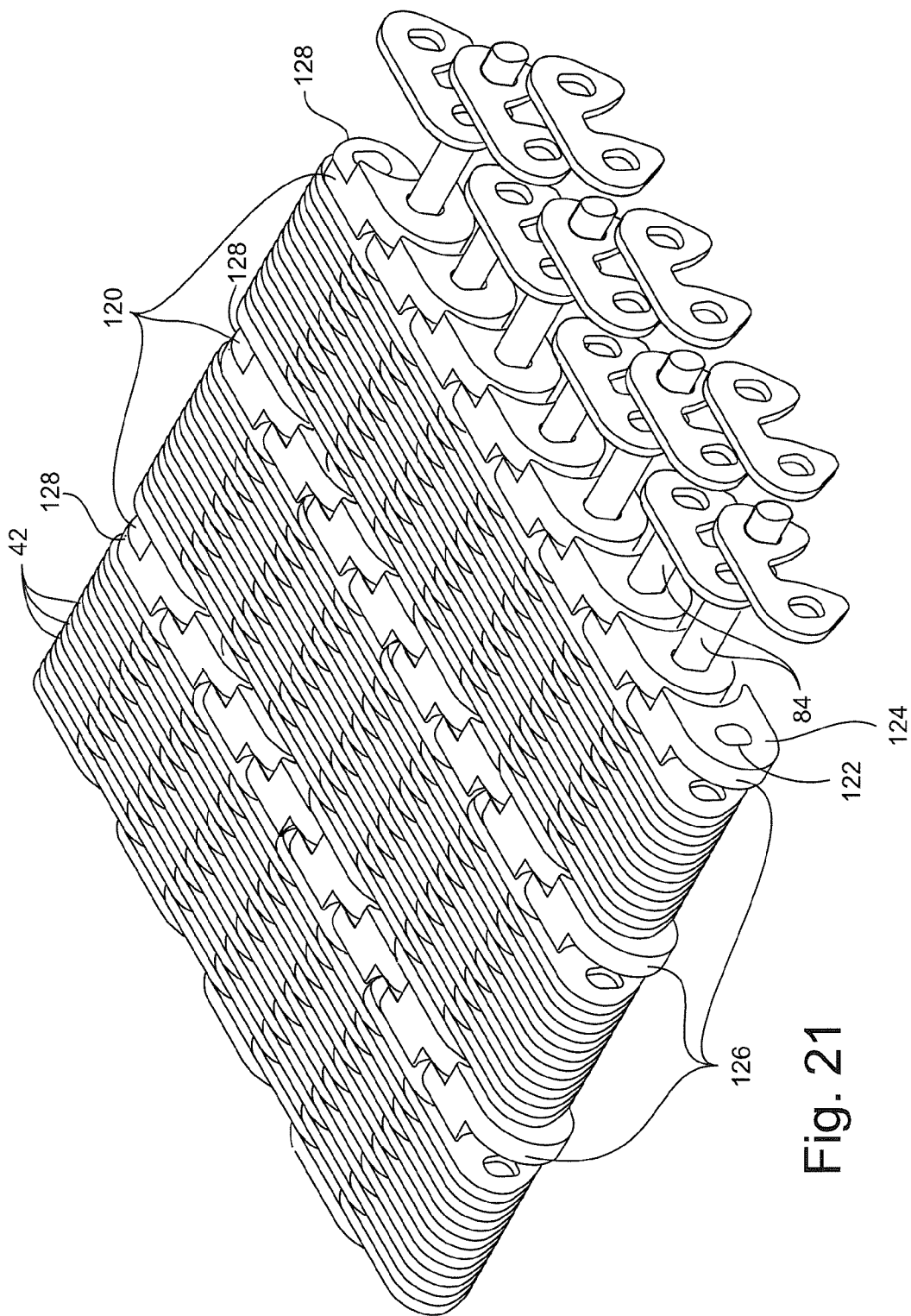
FIG. 21 is an exploded perspective view of a length of conveyor chain of FIG. 20, showing assembly of the chain.
Figure 22:
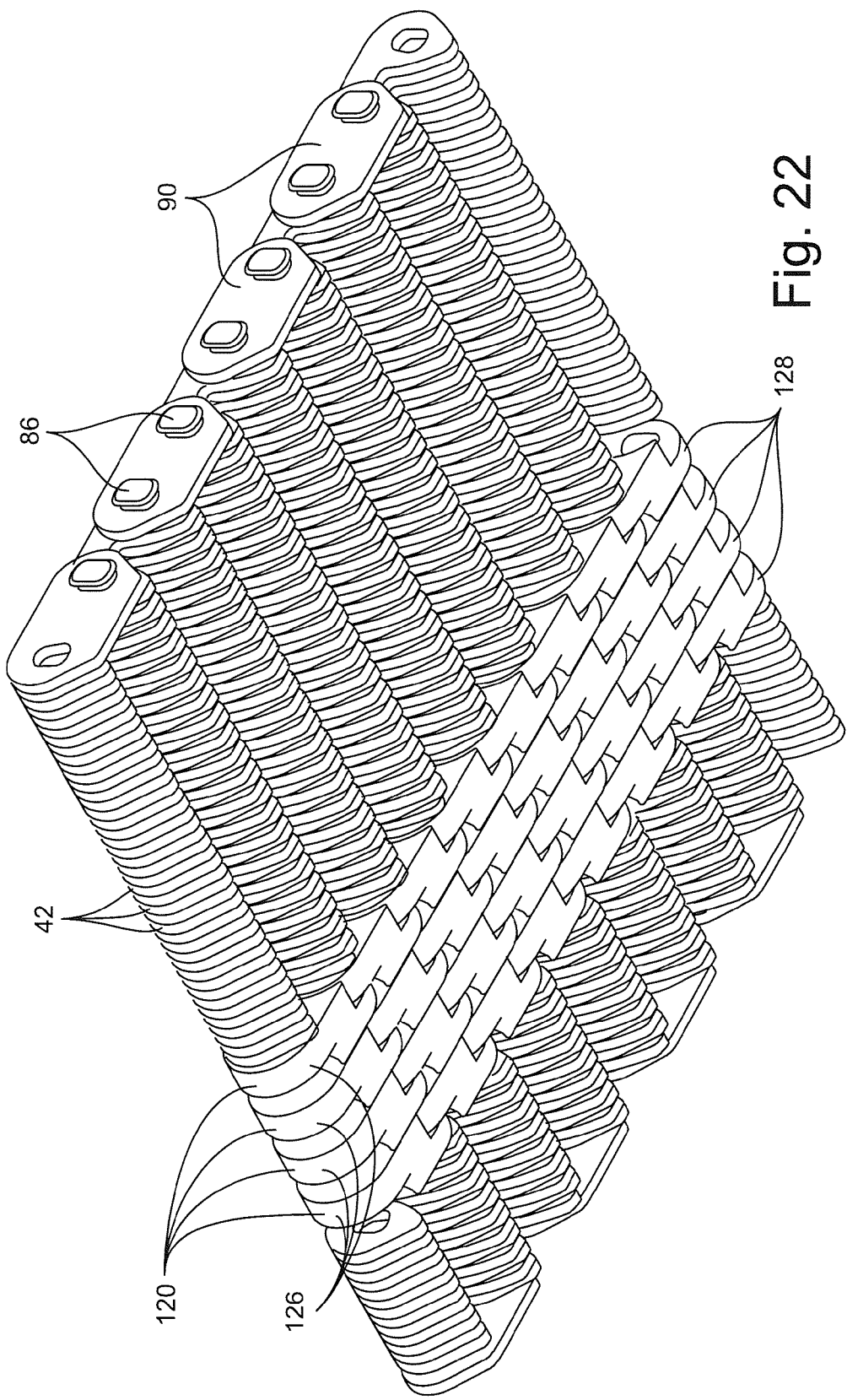
FIG. 22 is a bottom perspective view of a length of conveyor chain showing a wear resistant strip consisting of 4 adjacent rows of nested wear resistant links, with no conventional links situated between the adjacent rows.

The inclusion of nested wear resistant links 120 in a chain assembly, see FIGS. 20-22, eliminates the gap that exists between consecutive wear resistant links that do not have the nesting feature. Compare to FIGS. 12-14, where a gap exists between consecutive wear resistant links 46 that are without the nesting feature. The gap-free character of a chain that includes nested links 120 provides a number of additional benefits. For example, it increases the amount of wear resistant link surface area that is in contact with the chain supporting surface, thereby reducing bearing stresses and further reducing the rate of chain wear.

Figure 23:
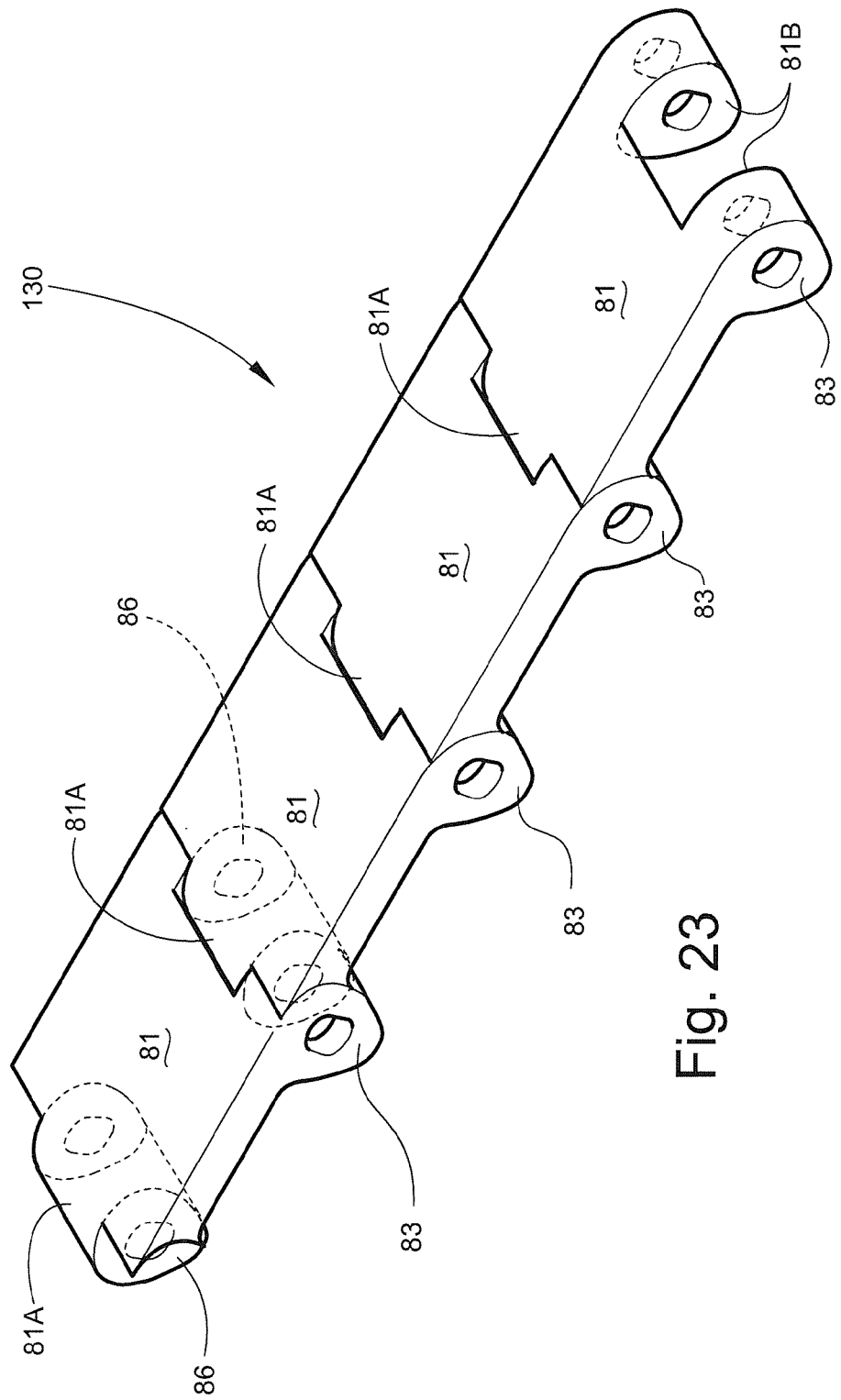
FIG. 23 is a row of nesting wear resistant link according to another embodiment.

In other embodiments, wear resistant links may be constructed as modules 81, as shown in FIG. 23. The individual conveyor links 81 are formed in a male/female design with an outwardly-projecting forward end 81A of one conveyor link 81 fitting into a recess formed by a pair of trailing ends 81B of another like conveyor link 81. Teeth 83 are positioned, as shown, on opposing sides of each trailing end 81B of each conveyor link 81. A single, relatively wide, tooth 86 is carried by the outwardly-projecting forward end 81A and permits the conveyor links 81 to be joined by alignment of teeth 83 with the tooth 86. A pin, not shown, is inserted through an opening in the aligned teeth 83, 86, fastening the adjacent conveyor links 81 together. The entire conveyor 130 having many conveyor links 81 is built in the same manner. Once inserted, a head is formed on the leading end of the pin to join the conveyor links together (not shown). Of course, as many of the conveyor links 81 are assembled widthwise to make up a chain having the desired width held in the assembled state by a pin of suitable length.

The teeth 83, 86 are shaped as conventional silent chain teeth, meeting all of the standards set out above. Articulation of the conveyor links 83 around standard silent chain sprockets is thereby facilitated. The materials and other considerations, such as spacing and the percentage of wear resistant links in relation to the other links in the conveyor chain, as referred to above with regard to other wear resistant configurations, apply to these wear resistant links 81 as well.

Figure 24:
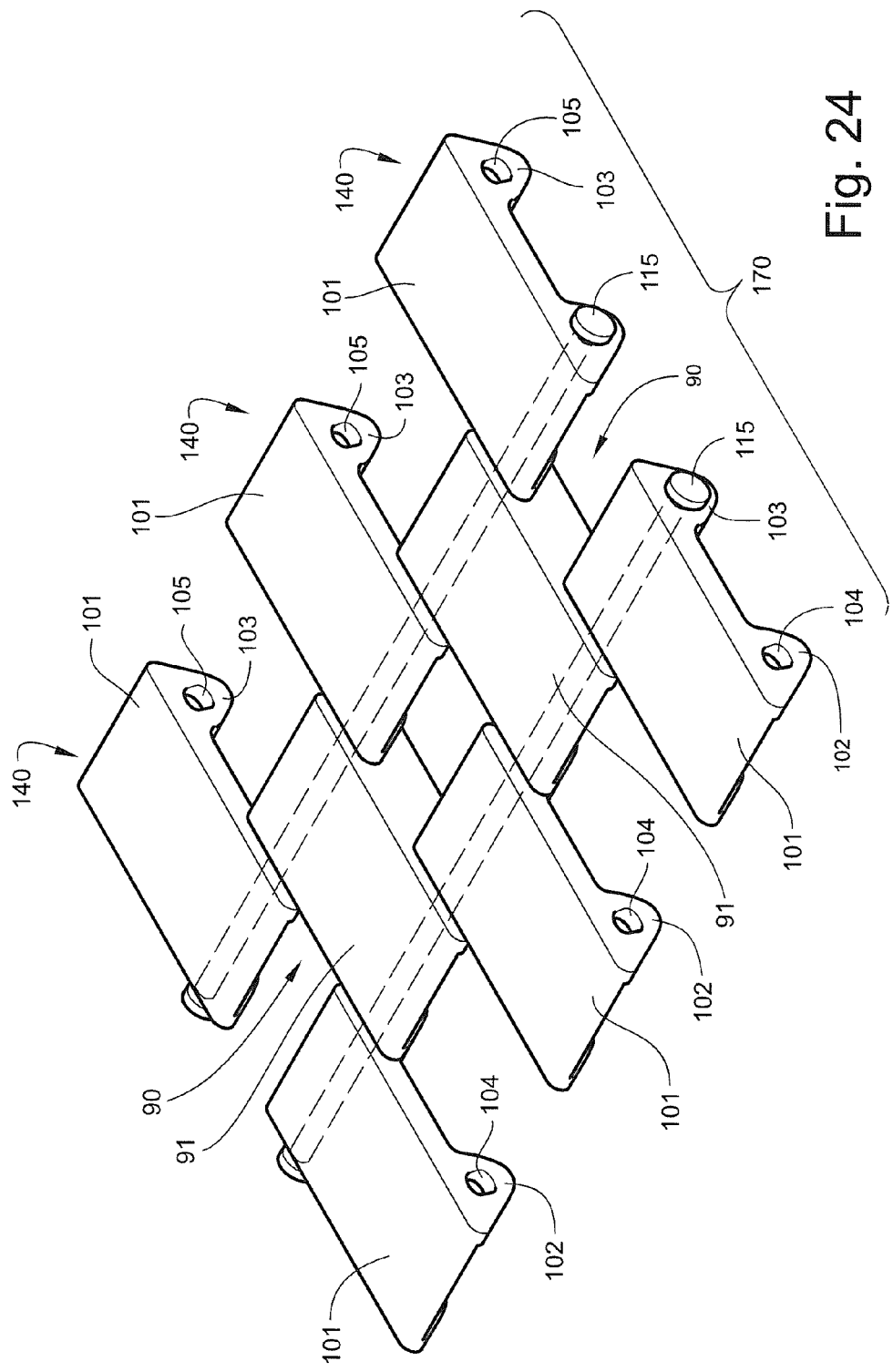
FIG. 24 is a chain with multiple rows of wear resistant links according to another embodiment.

FIG. 24 illustrates a chain 170 with multiple alternating rows of conveyor links 101 and wear resistant links 91. The conveyor links 140 each have a bearing surface 101 and have bores 104, 105 at respective ends 102, 103, forming rows of downward facing teeth. Wear resistant links 90 each have a bearing surface 91 and bores which line up with bores 104, 105 to receive rods 115 and form chain 170.

Figure 26:
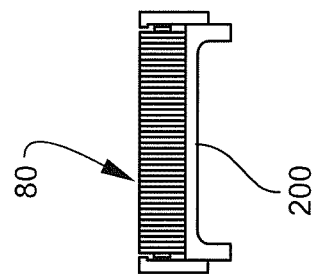
FIG. 26 is a front elevation of a chain conveyor, illustrating the chain conveyor riding on a wear plate.
Figure 25:
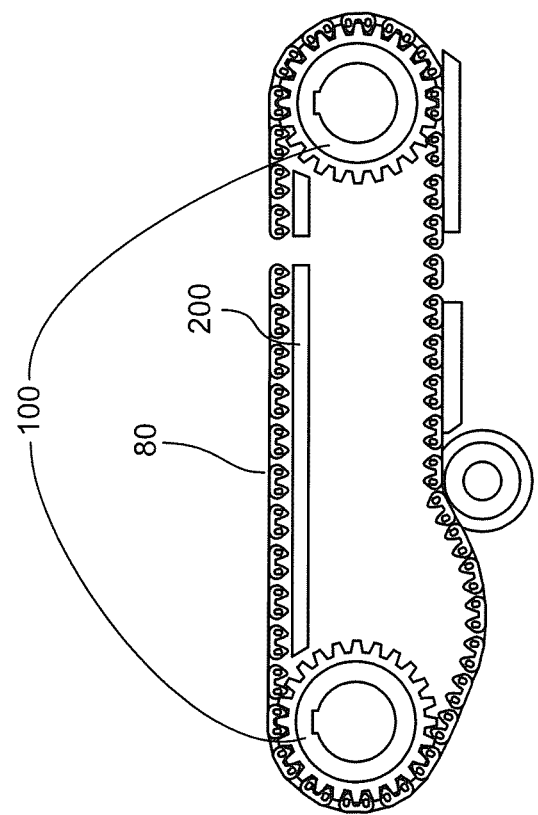
FIG. 25 is a fragmentary side elevation of a typical conveyor assembly of the type utilizing chain conveyors of the type described in this application.

FIGS. 25 and 26 illustrate respective side and front elevation views of a conveyor assembly of the type on which chain conveyors of the type described in this application are used. Note, particularly, that the chain 80 rides on a wear plate 200 that extends along the length and width of the conveyor, supporting the chain 80 as sprockets 100 drive the conveyor but also causing wear on the chain links, thus making desirable the wear resistant links described in this application.

In general, the provision of wear resistant links in a conveyor chain is not intended to be material-specific. Rather, the inclusion within the chain of selected wear resistant components that are designed and located within the chain is intended to influence and enhance the overall chain performance while minimizing the overall effect on chain cost and maintaining the desired characteristics provided by other, more conventional chain components. As is apparent, all links are wear resistant to some degree. The invention disclosed herein provides a selected number of links that are significantly more wear resistant than conventional links that make up most of the conveyor chain.

An end protector link and conveyor chain with end protector links is described above. Various details of the invention may be changed without departing from the scope of the invention. Furthermore, the foregoing description of the preferred embodiment of the invention and best mode for practicing the invention are provided for the purpose of illustration only and not for the purpose of limitation.

I claim:

1. A multi-link conveyor chain, comprising:
   (a) a first plurality of interconnected links;
   (b) a second plurality of links interspersed within the first plurality of interconnected links along a length of the conveyor chain; and
   (c) the first plurality of links and the second plurality of links being formed of respective homogeneous materials, the second plurality of links being formed from a homogeneous material that has a wear resistance that is greater than the wear resistance of the material used in the first plurality of links, with the interspersed second plurality of links positioned to engage a support surface on which the conveyor chain moves for providing enhanced wear resistance to the conveyor chain.

2. A multi-link conveyor chain according to claim 1, wherein the second plurality of links is spaced laterally across a width of the conveyor chain.

3. A multi-link conveyor chain according to claim 1, wherein the second plurality of links is spaced longitudinally along a length of the conveyor chain.

4. A multi-link conveyor chain according to claim 1, wherein the second plurality of links is spaced at regular intervals laterally across a width of the conveyor chain.

5. A multi-link conveyor chain according to claim 1, wherein the second plurality of links is spaced at regular intervals longitudinally along a length of the conveyor chain.

6. A multi-link conveyor chain according to claim 1, wherein the second plurality of links is spaced irregularly along a length and width of the conveyor chain.

7. A multi-link conveyor chain according to claim 1, wherein the second plurality of links are spaced laterally across a width of the conveyor chain to coincide with spacing of guide grooves formed in a sprocket gear over which the conveyor chain passes.

8. A multi-link conveyor chain according to claim 1, wherein the first plurality of links includes:
   (a) a first link segment having an outer wall in a first vertical plane defining a protective bearing surface having a forward-facing convex face and a rearward-facing concave face and a first, countersunk, pin access bore extending perpendicularly through the link between the forward-facing convex face and the rearward-facing concave face;
   (b) a second link segment integrally-formed with the first link segment and having an outer wall in a second vertical plane defining a protective bearing surface having a forward-facing concave face, a rearward-facing convex face having a second pin access bore extending perpendicularly through the link between the forward-facing convex face and the rearward-facing convex face;
   (c) the forward-facing convex face of the first link segment and the forward-facing concave face of the second link segment having respective complementary arcuate shapes adapted to nest with and move relative to a respective rearward-facing concave face and rearward-facing convex face of a like end protector link forward of the end protector link to which the end protector link is nested in the conveyor chain, and
   (d) laterally-extending pins extending through the pin access bores for pivotally connecting the links together to form the conveyor chain.

9. A multi-link conveyor chain according to claim 8, wherein the second plurality of links includes:
   (a) a first link segment having an outer wall in a first vertical plane defining a protective bearing surface having a forward-facing convex face and a rearward-facing concave face and a first, countersunk, pin access bore extending perpendicularly through the link between the forward-facing convex face and the rearward-facing concave face;
   (b) a second link segment integrally-formed with the first link segment and having an outer wall in a second vertical plane defining a protective bearing surface having a forward-facing concave face, a rearward-facing convex face having a second pin access bore extending perpendicularly through the link between the forward-facing convex face and the rearward-facing convex face;
   (c) the forward-facing convex face of the first link segment and the forward-facing concave face of the second link segment having respective complementary arcuate shapes adapted to nest with and move relative to a respective rearward-facing concave face and rearward-facing convex face of a like end protector link forward of the end protector link to which the end protector link is nested in the conveyor chain; and (d) the wear surface is defined by laterally-extending surfaces of the second plurality of links.

10. A multi-link conveyor chain according to claim 1, wherein the first plurality of links and the second plurality of links have downwardly extending teeth for driving engagement with teeth of a conveyor sprocket gear.

11. A multi-link conveyor chain according to claim 1, wherein the first plurality of links have downwardly-extending teeth for driving engagement with teeth of a conveyor sprocket gear, and the second plurality of teeth have substantially planar top and bottom surfaces.

12. A multi-link conveyor chain according to claim 1, wherein the first plurality of links have downwardly-extending teeth for driving engagement with teeth of a conveyor sprocket gear, and the second plurality of links have downwardly-extending teeth for driving engagement with teeth of a conveyor sprocket gear.

13. A multi-link conveyor chain according to claim 1, wherein the second plurality of links are positioned to form at least one longitudinally extending band of laterally adjacent links.

14. A multi-link conveyor chain according to claim 1, wherein the wear surface of the second plurality of links has a hardness of between approximately Rockwell C 40 and Rockwell C 52 RC.

\* \* \* \* \*